Dec. 10, 1935.   D. C. WRIGHT   2,023,631
ELECTRIC WELDING CONTROL DEVICE
Filed Aug. 20, 1932
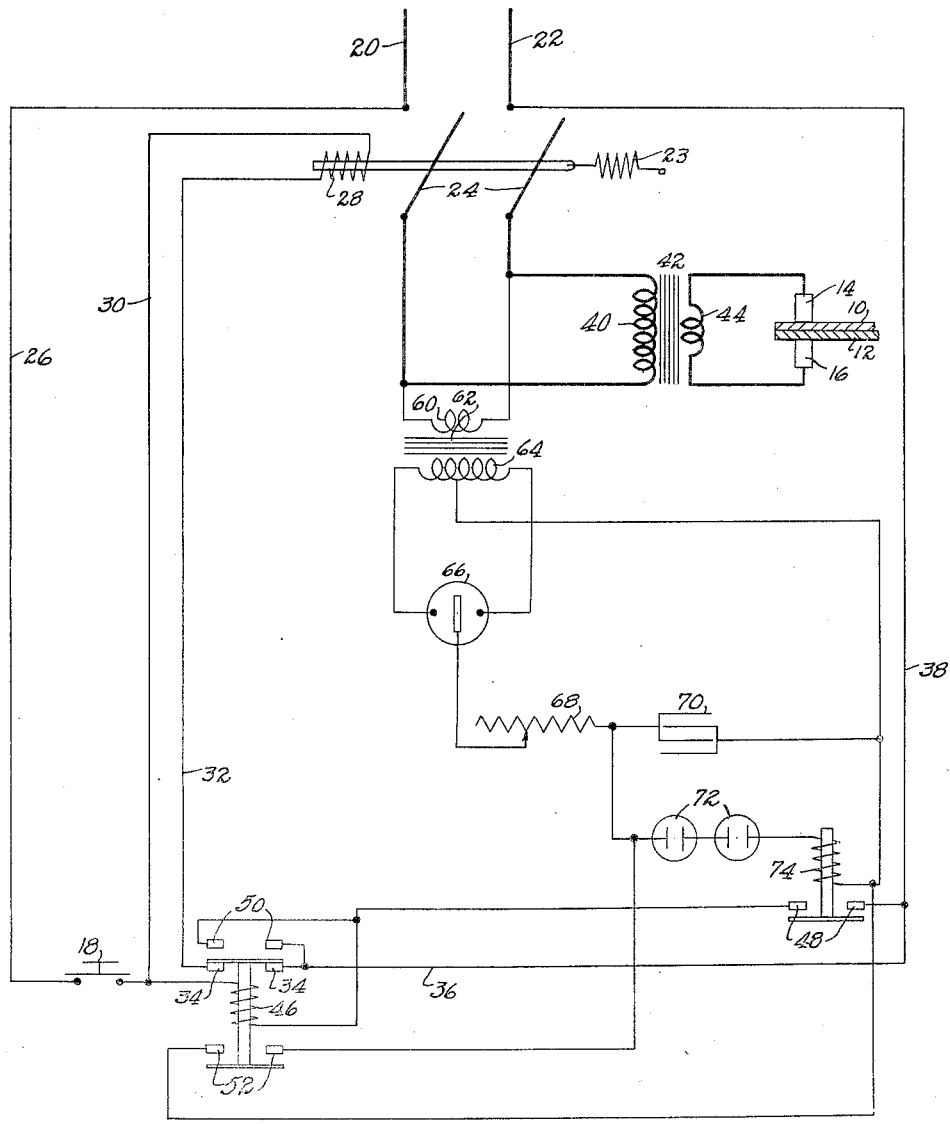
INVENTOR
David C. Wright,
BY Justin W. Macklin
ATTORNEY Patented Dec. 10, 1935

2,023,631

UNITED STATES PATENT OFFICE 2,023,631

ELECTRIC WELDING CONTROL DEVICE

David C. Wright, Euclid, Ohio, assignor to The Electric Controller & Manufacturing Company, Cleveland, Ohio, a corporation of Ohio Application August 20, 1932, Serial No. 629,642

34 Claims. (Cl. 219—4)

My invention relates to an electric welding control device and more particularly to such a device adapted to limit the flow of welding current to a predetermined length of time, regardless of the varying surface conditions or thickness of the pieces to be welded.

In my co-pending application filed on even date, being Serial No. 629,643, I have shown and described a weld controlling device responsive to the conditions of the material being welded. The present invention is of a similar character but is, however, adapted to interrupt the flow of current to a weld after a predetermined length of time, instead of as a function of the current value, as is the case in the companion application. In many uses it is desirable to have the current maintained in the weld for a constant period of time rather than having the time variable as a function of the current value, such as in cases where the metal parts to be welded together have been treated in an acid cleaning bath or the like, and are then welded in an automatic machine in which the time of current application must be constant in order to coincide with a mechanical feeding mechanism.

It is an object of this present invention, therefore, to provide a control device which interrupts the current flow in a circuit after a predetermined length of time.

It is another object to provide a timing device which maintains the flow of current in a welding circuit for a predetermined length of time.

A further object is to provide a device which may be suitably adjustable for providing a relatively wide range of permissible time settings for timing the flow of current to a weld.

A still further object is to provide a timing device having no rotating parts and comprising apparatus mainly of a stationary character.

Yet another object is to provide a device having a construction which is easily manufactured at a low cost and which can be assembled in a neat and compact form.

Further and more specific objects will be apparent in my invention as is hereinafter more fully described.

Referring to the attached drawing, a diagrammatic sketch of a circuit embodying a form of my invention for controlling the application of current to a weld is shown.

Briefly considered, this embodiment comprises a condenser 70, having a definite time lag, connected in series with a variable resistance 68, and then across the secondary terminals of a shunt transformer 62, through a double wave rectifying device 66, the primary of the shunt transformer 62 being connected across a supply circuit, as for example an alternating current circuit, so that a voltage proportional to the circuit voltage is manifested across the aforementioned condenser, which voltage at a predetermined value and after the elapse of a definite time interval depending on the setting of the variable resistance 68 and the time lag of condenser 70, will arc over neon tubes 72 shunted across the condenser 70 and thereby actuate a relay 74 to open the supply circuit.

In the accompanying figure metal plates 10 and 12, shown in fragmentary section, may be presented to spot welding electrodes 14 and 16 preparatory to being welded together. To initiate the welding operation push button 18 is pressed and held down, thereby closing a circuit from supply line 20 having usual substantially constant voltage available in shop practice. From the line 20, current passes through conductor 26, push button 18, conductor 30, closing coil 28 of switch 24, conductor 32, normally closed contacts 34, conductors 36 and 38, to the other supply line 22, thereby closing a main switch 24 which is normally held open by spring 23 and energizing primary winding 40 of transformer 42. Energy is inductively transferred to the secondary winding 44 and thence to the plates 10 and 12 through electrodes 14 and 16.

Connected across the primary side of the transformer 42 is another primary winding 60 of a shunt transformer 62. When the supply circuit is energized and a voltage thereby impressed on primary winding 60, a corresponding voltage is induced in a secondary winding 64, which has its ends connected to a rectifying device 66 in such manner as to produce a uni-directional voltage by a double wave rectification of the voltage delivered by the secondary winding 64. Between the midpoint of the secondary winding 64 and the rectifying device 66 are connected in series an adjustable resistance 68 and a condenser 70 which complete the circuit for a uni-directional current resulting from the aforementioned uni-directional voltage. Shunted across condenser 70 are neon tubes 72 and a low energy consuming relay 74 connected in series with the tubes.

The characteristic of the neon tubes of importance is that they will pass no current until a voltage sufficiently high to break down the gas in the tubes is impressed on the tube electrodes. When the supply circuit is energized and current is delivered to the welding electrodes, the uni-directional voltage is delivered to the circuit including the adjustable resistance 68 and the condenser 70. When after a definite time, depending upon the setting of the variable resistance 68, the voltage across condenser 70 reaches a predetermined value the gas in the neon tubes becomes conducting and current flows from the condenser 70 through the neon tubes 72, the relay 74 and back to the condenser 70, or vice versa, thereby causing the relay 74 to close contacts 48. A circuit is then formed from the supply line 20 through conductor 26, push button 18, solenoid 46, contacts 48, conductor 38, to the other supply line 22, which causes the solenoid 46 to become energized and open contacts 34 and close contacts 50 and 52. Opening of contacts 34 causes the main switch 24 to open, thereby interrupting the welding current. At the same time, the closing of contacts 52 shortcircuits the condenser 70, thereby reducing its voltage to zero and de-energizing the relay 74, opening contacts 48. The closing of contacts 50 maintains the energization of solenoid 46, which would otherwise be de-energized by the opening of contacts 48. The welding operation has now been completed and the push button 18 may accordingly be released.

The timing of the application of the welding current may be varied in several ways. The setting of the device for a given series of welds is accomplished by adjusting the variable resistance 68. By increasing the resistance 68 the time of maintaining welding current is increased. By decreasing the resistance 68 the time of maintaining welding current is decreased. It will be obvious that by providing suitable gradations of the resistance 68 an infinite number of current timings are obtainable. The timing characteristic for any given resistance setting may be changed by changing the condenser 70. It is well known that the time lag or charging time of a condenser depends on the capacitance rating of the condenser. A condenser of high capacitance will have a longer charging period. A condenser of low capacitance will have a shorter charging period. It will be understood also that the time lag or charging time of the condenser is relatively great compared with that of the resistance. Thus it is possible without departing from the spirit and scope of my invention to make the condenser 70 variable, or to construct it of sections so that by cutting in or cut sections the capacitance may be varied and hence the time current characteristic of the device.

It is also possible to vary the time of welding by varying the number of neon tubes 72 shunted across the condenser 70. While I have shown only two tubes in the accompanying figure any other suitable number may be used. For example, if a single neon tube shunted across condenser 70 becomes conducting when the condenser voltage reaches 40 volts, it will be obvious that if two neon tubes are used the condenser voltage must be 80 volts and for three tubes 120 volts, etc. Since it takes longer for the condenser 70 to reach higher voltages than for lower voltages, the time of application of the welding current will be longer.

Still another way of varying the time of welding is by varying the magnitude of the voltage impressed on condenser 70 and resistance 68. The higher this voltage the quicker the condenser 70 will reach the voltage at which the neon tubes become conducting, the reverse being the case for lower impressed voltages. This impressed voltage may be varied by placing taps in the secondary winding 64 and switching between these taps for the desired timing; or the whole secondary winding 64 may be inductively variable with respect to the primary winding 60, as in the case of an induction regulator. Thus, for a constant voltage of the supply circuit the voltage delivered by the secondary winding 64 may be varied according to the time setting desired, and consequently the voltage across condenser 70.

It will be apparent that any one, all, or combination of the methods just described may be used to establish the desired time characteristic. Further, it will be apparent that after the setting for a desired time characteristic has been made, that a series of welding operations may be carried out without changing this setting. The primary winding 60 may be placed at any point in the supply circuit suitable. While I have shown this winding placed on the primary side of the transformer 42, it may be placed on the secondary side as well, without affecting the efficiency of the operation of the control device.

In my copending application Ser. No. 629,643 I have shown in Fig. 2 a diagrammatic arrangement similar to that shown in the accompanying figure, but with circuits arranged so that it is unnecessary to hold the push button 18 down during the welding operation. The circuit described in that figure may be adapted to my present invention in as equally an efficient manner.

While I have described my invention with reference to specific apparatus and the specific application to welding, it is to be understood that many modifications and applications of it may be made without departing from the spirit or scope of the appended claims.

I claim:

1. The combination with electrodes for welding metals together, and a circuit for supplying current thereto at a substantially constant voltage, of means responsive to said voltage for producing another voltage of different characteristics and substantially proportional to said first mentioned voltage, and means responsive to said second mentioned voltage adapted to sustain said current for a predetermined length of time.

2. The combination with electrodes for welding metals together, and a circuit for supplying current thereto at a substantially constant voltage, of means responsive to said voltage for producing a second voltage of different characteristics and substantially proportional to said first mentioned voltage, means responsive to said second mentioned voltage adapted to sustain said current for a predetermined length of time, and means for varying the time of sustaining said current.

3. The combination with a pair of welding electrodes adapted to present an electrical current to parts to be welded together, and means for supplying current to said electrodes at a substantially constant voltage, of means for interrupting said current after a predetermined length of time, said means embodying a normally non-conducting gas-filled deviced in series with a relay and adapted to become conducting to energize said relay to cause said interrupting of said current when a voltage of predetermined value corresponding to the magnitude of said first mentioned voltage is impressed on its terminals.

4. The combination with a pair of welding electrodes adapted to present an electrical current to parts to be welded together, means for supplying electric current thereto at a substantially constant voltage, of means responsive to said voltage for producing a second voltage of unidirectional characteristic substantially proportional to said first mentioned voltage, a condenser adapted to have a current flow through it caused by said unidirectional voltage, to produce a voltage drop within said condenser, a neon tube and a relay associated with said condenser, said neon tube being adapted to become conducting to energize said relay to cause said current to the weld to be interrupted when the voltage drop in said condenser reaches a predetermined value.

5. In an electrical welding timing device the combination of a circuit for supplying alternating current at a substantially constant alternating voltage, of means responsive to said alternating voltage for producing a unidirectional voltage substantially proportional to said alternating voltage, circuit means adapted to admit a current caused by said unidirectional voltage, said circuit means including a capacity element and a resistance element adapted to permit a voltage to be established across said capacity element with a definite time delay and proportional to said unidirectional voltage, and means responsive to a predetermined value of said voltage across said capacity element for discontinuing the flow of said alternating current.

6. The combination with a pair of welding electrodes, and means for presenting current to said electrodes at a given voltage, of means responsive to said voltage for producing a uni-directional voltage substantially proportional to said first mentioned voltage, circuit means for admitting a current caused by said unidirectional voltage, said circuit means including a condenser and a resistance adapted to delay the voltage rise within said condenser consequent upon the flow of said latter current, and a valvular gas-filled device associated with said condenser adapted to by-pass current around said condenser when said voltage rise within said condenser reaches a predetermined value and thereby operate an auxiliary circuit to interrupt said first mentioned current.

7. In a device of the character described, the combination with a source of alternating current supply and means for spot welding metals with current from said source of supply at a given voltage, of means responsive to said voltage for producing a second voltage similar to and proportional to said first mentioned voltage, means for rectifying said last mentioned voltage to produce a uni-directional voltage, circuit means adapted to admit a current caused by said unidirectional voltage, said circuit means including a condenser and a resistance adapted to permit a voltage to be built up across said condenser proportional to said first mentioned voltage, and a valvular by-pass device associated with said condenser and adapted to by-pass current around said condenser consequent upon the voltage across said condenser reaching a predetermined value and thereby effect the interruption of said first mentioned current.

8. The combination with electrodes for welding metals together, and a circuit for supplying alternating current thereto at a suitable voltage, means responsive to said voltage for producing a unidirectional voltage substantially proportional to said first mentioned voltage, and means responsive to said unidirectional voltage for interrupting said alternating current after the elapse of a predetermined length of time.

9. The combination with welding electrodes adapted to spot weld metal parts together and circuit means for supplying alternating current to said electrodes at a given voltage, of means for producing a second voltage substantially proportional to said first mentioned voltage, means for rectifying said last mentioned voltage to produce a continuous unidirectional voltage of the same proportionality as said first mentioned voltage, a resistance means and a condenser means adapted to absorb said unidirectional voltage in unequal proportions thereof, said condenser means being adapted to absorb said voltage at a slower rate than said resistance means, and means controlled by the rate of voltage absorption of said condenser means for causing the interruption of said current.

10. The combination with a pair of welding electrodes, of a circuit for supplying alternating current thereto at a suitable alternating voltage, a control circuit inductively related to said first circuit and adapted to receive an inductive voltage therefrom corresponding to said alternating voltage, a rectifying device disposed in said control circuit adapted to rectify said inductive voltage to produce a unidirectional voltage corresponding in magnitude to said inductive voltage, a resistance and a condenser disposed in said control circuit, said resistance and condenser being adapted to absorb said unidirectional voltage at a definite rate, a by-pass circuit including a valvular gas-filled device and a relay, said by-pass circuit being connected to the terminals of said condenser, said valvular device being adapted to admit current to said by-pass circuit to energize said relay to interrupt said current to said electrodes when the voltage absorbed by said condenser reaches a predetermined value.

11. In a welding control apparatus the combination of, a circuit adapted to supply current to a weld, a control circuit inductively related to said supply circuit and adapted to receive a substantially constant induced voltage therefrom, a potential absorbing device in said control circuit, and means responsive to the potential absorbed by said device for automatically opening said supply circuit after a predetermined length of time.

12. The combination of, a current supply circuit, a control circuit inductively related to said supply circuit, a condenser device in said control circuit, and means responsive to a predetermined potential across said condenser device for opening said supply circuit.

13. The combination of, a current supply circuit, a control circuit inductively related to said supply circuit, a by-pass circuit shunting a portion of said control circuit, and means normally interrupting said by-pass circuit adapted to close the circuit when a predetermined voltage is impressed thereupon.

14. The combination of, a current supply circuit, a control circuit inductively related to said supply circuit, a condenser device in said control circuit, means whereby said device has a potential developed within it, and means responsive to a certain value of said potential for opening said supply circuit and for substantially reducing the potential in said condenser device to zero.

15. The combination of a substantially constant potential supply circuit, a control circuit inductively related thereto and adapted to receive a corresponding induced constant potential therefrom, condenser means in said control circuit adapted to absorb a portion of said induced potential with a time delay, and means responsive to the potential absorbed for opening said supply circuit and for subsequently reducing the potential in said condenser device substantially to zero.

16. In a device of the class described, a supply circuit, a control circuit, a source of electric current for said control circuit, means associated with the control circuit and operable responsive to the flow of current in a portion of said control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to said control circuit for a time interval whereby the voltage impressed on the means preventing the flow of current in said portion of the control circuit is less than that supplied to the control circuit for a time interval, and whereby the means responsive to the flow of current in said portion of the control circuit is operable after a time interval.

17. In a device of the class described, a supply circuit, a control circuit, a source of electric current for said control circuit, means associated with the control circuit and operable responsive to the flow of current in a portion of said control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to said control circuit for a time interval whereby the voltage impressed on the means preventing the flow of current in said portion of the control circuit is less than that supplied to the control circuit for a time interval, and whereby the means responsive to the flow of current in said portion of the control circuit is operable after a time interval, and means to adjustably vary the capacity of the capacity element.

18. In a device of the class described, a supply circuit, a control circuit, a source of electric current for said control circuit, means associated with the control circuit and operable responsive to the flow of current in a portion of said control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to said control circuit for a time interval, and a resistance adapted to retard the rate of flow of current to the capacity element to increase the time interval during which the capacity element absorbs current, whereby the voltage impressed on the means preventing the flow of current in said portion of the control circuit is less than that supplied to the control circuit for a time interval, and whereby the means responsive to the flow of current in said portion of the control circuit is operable after a time interval.

19. In a device of the class described, a supply circuit, a control circuit, a source of electric current for said control circuit, means associated with the control circuit and operable responsive to the flow of current in a portion of said control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to said control circuit for a time interval, and a resistance adapted to retard the rate of flow of current to the capacity element to increase the time interval during which the capacity element absorbs current, whereby the voltage impressed on the means preventing the flow of current in said portion of the control circuit is less than that supplied to the control circuit for a time interval, and whereby the means responsive to the flow of current in said portion of the control circuit is operable after a time interval, and means to adjustably vary the value of said resistance.

20. In a device of the class described, a supply circuit, a control circuit, a source of electric current for said control circuit, means associated with the control circuit and operable responsive to the flow of current in a portion of said control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, the control circuit also having associated therewith a capacity element adapted to absorb current supplied to said control circuit for a time interval, whereby the voltage impressed on the means preventing the flow of current in said portion of the control circuit is less than that supplied to the control circuit for a time interval, and whereby the means responsive to the flow of current in said portion of the control circuit is operable after a time interval, and means responsive to the flow of current in said portion of the control circuit and operable to effect the discharge of the capacity element.

21. In a device of the class described, a supply circuit, a control circuit, a source of electric current for said control circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the volage supplied to the control circuit is impressed thereon, said last named means comprising a valvular gas-filled device, the control circuit also having associated therewith a capacity element adapted to absorb current supplied to said control circuit for a time interval, whereby the voltage impressed on the valvular gas filled device is less than that supplied to the control circuit for a time interval, and whereby the means responsive to the flow of current in said portion of the control circuit is operable after a time interval.

22. In a device of the class described, a supply circuit, a control circuit, a source of electric current for said control circuit, means associated with the control circuit and operable responsive to the flow of current in a portion of the control circuit to control the flow of current in the supply circuit, the control circuit having means associated therewith and normally preventing the flow of current in said portion of the control circuit, said means being operable to permit the flow of current in said portion of the control circuit when a voltage corresponding to the voltage supplied to the control circuit is impressed thereon, said last named means comprising a valvular gas-filled device, the control circuit also having associated therewith a capacity element adapted to absorb current supplied to said control circuit for a time interval, and a resistance adapted to retard the rate of flow of current to the capacity element to increase the time interval during which the capacity element absorbs current, whereby the voltage impressed on the valvular gas-filled device is less than that supplied to the control circuit for a time interval and whereby the means responsive to the flow of current in said portion of the control circuit is operable after a time interval.

23. The device described in claim 21 and which is characterized by means to adjustably vary the capacity of the capacity element.

24. The device described in claim 22 and which is characterized by means to adjustably vary the capacity of the capacity element.

25. The device described in claim 22 and which is characterized by means to adjustably vary the value of the resistance.

26. Apparatus for controlling the duration of current flow in an electrical circuit containing a work-piece, comprising: a control circuit including means, responsive to a predetermined electro-motive-force, for effecting interruption of current flow to said work-piece; and means, controlled by the voltage applied to said control circuit, for applying electro-motive-force to said responsive means, said controlled means including means for altering the effect of said electro-motive-force on said responsive means to the value of said predetermined electro-motive-force during a period of time dependent upon the voltage applied to said control circuit.

27. Apparatus for controlling the duration of current flow in an electrical circuit containing a work-piece, comprising: a control circuit including means, responsive to a predetermined electro-motive-force, for effecting interruption of current flow to said work-piece; and means, controlled by the voltage applied to said control circuit, for applying electro-motive-force to said responsive means; said controlled means including means for retarding the building up of said applied electro-motive-force to said predetermined electro-motive-force for a duration of time dependent upon the voltage applied to said control circuit.

28. Apparatus for controlling the duration of current flow in an electrical circuit containing a work-piece, comprising: a control circuit including electrical energy accumulating means, controlled by the voltage applied to said control circuit, operable after accumulating a predetermined value of electro-motive-force to expend at least a portion of said accumulated electro-motive-force, the duration of time for accumulating said predetermined electro-motive-force being dependent upon the voltage applied to said control circuit; and means, responsive to said expending electro-motive-force, for effecting interruption of current flow to said work-piece.

29. Apparatus for controlling the duration of current flow in an electrical circuit containing a work-piece, comprising: a control circuit including means, responsive to a predetermined electro-motive-force, for effecting interruption of current flow to said work-piece; and means, controlled by the voltage applied to said control circuit, for applying electro-motive-force to said responsive means; said controlled means including means for altering the effect of said electro-motive-force on said responsive means to the value of said predetermined electro-motive-force during a period of time dependent upon the voltage applied to said control circuit, said duration of time being greater for small voltage values across said control circuit and less for large voltage values.

30. Apparatus for controlling the duration of current flow in an electrical circuit containing a work-piece, comprising: a control circuit including normally non-conducting means rendered conductive when subjected to a predetermined electro-motive-force for effecting interruption of current flow to said work-piece; and means, controlled by the voltage applied to said control circuit, for applying electro-motive-force to said normally non-conductive means; said controlled means including means for altering the effect of said electro-motive-force on said normally non-conductive means to the value of said predetermined electro-motive-force during a period of time dependent upon the voltage applied to said control circuit, to thereby render said normally non-conductive means conducting to interrupt current flow to said work-piece after a duration of time dependent upon the voltage applied to said control circuit.

31. Apparatus for controlling the duration of current flow in an electrical circuit containing a work-piece, comprising: a control circuit including means, responsive to a predetermined electro-motive-force, for effecting interruption of current flow to said work-piece; means controlled by the voltage applied to said control circuit, for applying electro-motive-force to said responsive means; said controlled means including means for altering the effect of said electro-motive-force on said responsive means to the value of said predetermined electro-motive-force during a period of time dependent upon the voltage applied to said control circuit; and means for varying the duration of said period of time.

32. Apparatus for controlling the duration of current flow in an electrical circuit containing a work-piece, comprising: a control circuit including means operable to permit application of current to said work-piece circuit, and responsive to a predetermined electro-motive-force, for effecting interruption of current flow to said work-piece; means controlled by the voltage applied to said control circuit, for applying electro-motive-force to said responsive means; said controlled means including means for altering the effect of said electro-motive-force on said responsive means to the value of said predetermined electro-motive-force during a period of time dependent upon the voltage applied to said control circuit; and means operable, after said responsive means interrupts the flow of current to said work-piece to de-energize said controlled means, whereby said responsive means operate to permit re-application of current to said work-piece.

33. Apparatus for controlling the duration of current flow in an electrical circuit containing a work-piece, comprising: a control circuit including electrical energy accumulating means, controlled by the voltage applied to said control circuit, and operable after accumulating a predetermined value of electro-motive-force to expend at least a portion of said accumulated electro-motive-force, the duration of time for accumulating said predetermined electro-motive-force being dependent upon the voltage applied to said control circuit; means operable to permit application of current to said work-piece circuit, and responsive to said expending electro-motive-force, for effecting interruption of current flow to said work-piece; and means operable, after said responsive means interrupts the flow of current to said work-piece, to de-energize said accumulating means, whereby said responsive means operate to permit re-application of current to said work-piece.

34. Apparatus for controlling the duration of current flow in an electrical circuit comprising: means responsive to a predetermined electro-motive-force for affecting the value of current flow in at least a part of said circuit; and means controlled by the voltage applied to said circuit for applying electro-motive-force to said responsive means, said controlled means altering the effect of said electro-motive-force on said responsive means to the value of said predetermined electro-motive-force during a period of time dependent upon the voltage applied to said circuit.

DAVID C. WRIGHT.